United States Patent

Bertelson

[11] Patent Number: 5,988,612
[45] Date of Patent: Nov. 23, 1999

[54] COMPOSITE HELICAL SPRINGS AND PROCESS OF MANUFACTURE

[76] Inventor: Peter C. Bertelson, 208 Sly St., Roscommon, Mich. 48653

[21] Appl. No.: 09/127,943

[22] Filed: Aug. 1, 1998

Related U.S. Application Data

[60] Provisional application No. 60/055,001, Aug. 7, 1997.

[51] Int. Cl.[6] ............................... F16F 1/36; B29C 67/14
[52] U.S. Cl. .................................................. 267/148
[58] Field of Search ............................ 267/148, 166; 156/169, 175, 180, 257; 264/281

[56] References Cited

U.S. PATENT DOCUMENTS

| | | | |
|---|---|---|---|
| 4,380,483 | 4/1983 | Kliger | 156/169 |
| 4,434,121 | 2/1984 | Schaper | 267/174 |
| 4,473,217 | 9/1984 | Hashimoto | 267/149 |
| 4,753,423 | 6/1988 | Ukai et al. | 267/186 |
| 5,685,525 | 11/1997 | Oguri et al. | 267/148 |

FOREIGN PATENT DOCUMENTS

| | | | |
|---|---|---|---|
| 2401760 | 4/1979 | France | 267/148 |
| 56-18136 | 2/1981 | Japan | 267/148 |
| 0052637 | 5/1981 | Japan | 267/148 |
| 0215135 | 9/1987 | Japan | 267/148 |
| 269736 | 10/1989 | Japan | 267/148 |
| 4312237 | 11/1992 | Japan | 267/148 |

*Primary Examiner*—Chris Schwartz
*Attorney, Agent, or Firm*—John R. Benefiel

[57] ABSTRACT

A helical spring is formed by winding a fiber bundle onto a core at a predetermined wind angle and then winding the wound core onto a grooved mold. The fibers have a thermosetting material thereon which is cured as the wound core advances along the groove by heating of the mold, the mold rotated to achieve this advance. A frictional engagement at the delivery end is set up between the wound core and the groove to pull and stretch the wound core and to thereby optimally orient the fibers before setting.

2 Claims, 1 Drawing Sheet

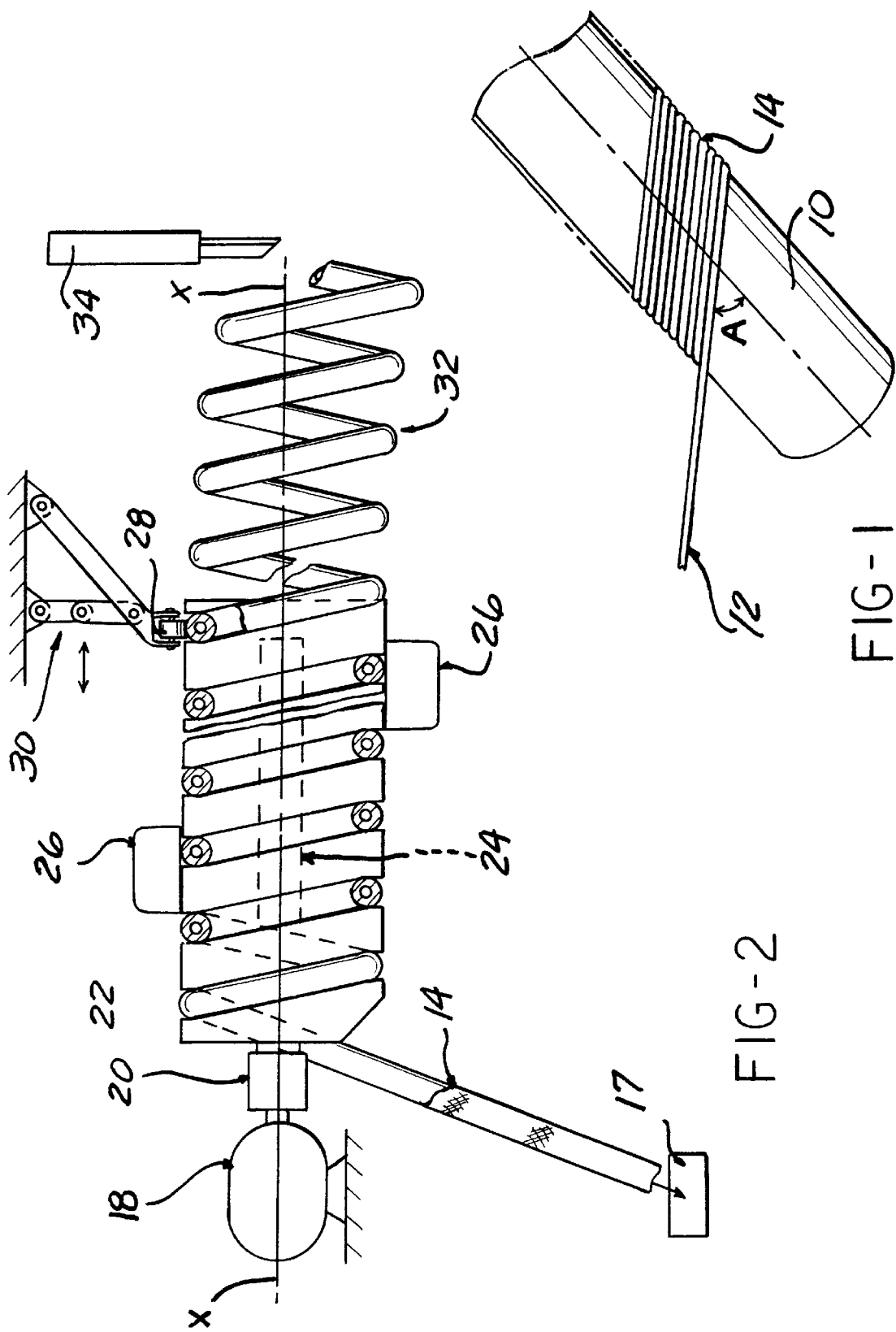

COMPOSITE HELICAL SPRINGS AND PROCESS OF MANUFACTURE

CROSS REFERENCE TO RELATED APPLICATIONS

This application claims priority of provisional application 60,055,001 filed on Aug. 7, 1997.

BACKGROUND OF INVENTION

This application concerns helical springs and processes of spring manufacturing. Helical springs are in widespread use since they are capable of providing a large spring force in a compact form. This spring force is generated by elastic bending of the wire forming the helix along its entire length.

It has long been recognized that the inner portions of the cross section of an element in bending are but lightly stressed, and more efficient use of material would result from concentrating the material of the element in its outer regions of the element.

It has heretofore been proposed that since the outer regions of an element in bending are stressed in tension, a lightweight spring could be provided by wrapping a lightweight core with high tensile strength fibers.

However, previous attempts have involved the use of a fiber layer made up of more or less randomly oriented fibers, this layer wrapped onto a core with a resin bonding agent. This composite structure is then wound on a mandrel and cured in an oven to form a single helical spring.

The random fiber orientation inherent in this approach does not provide a uniform, controlled spring constant or efficient use of material, as the individual fibers are stressed to a greater or lesser extent depending on their orientation.

Another approach, described in U.S. Pat. No. 4,260,143, involves use of a braided fiber bundle shaped to form a helical spring, again using a stationary helically grooved mandrel. This does not stress the fibers optimally since the braiding orients the individual fibers making up the braiding at various angles with respect to the core such that some of the fibers are not fully stressed.

More importantly, a process which only manufactures the springs one at a time is not fast enough for industrial production of the springs, and does not itself lend itself to uniformity of the spring characteristics.

It would also be very advantageous if the spring rate could be easily controlled by simple design variations in the spring construction, which has not been heretofore possible.

It is the object of the present invention to provide a lightweight helical spring of a composite construction as described in which the spring rate can be maintained at a uniform controlled rate and which can be varied by a simple a design parameter.

It is a further object of the invention to provide a process of manufacture of a composite helical spring which allows a continuous production of the springs, which are of a uniform configuration, suitable for industrial application.

SUMMARY OF THE INVENTION

The above recited objects are achieved by a composite spring comprised of a lightweight core or mandrel, preferably hollow or porous, and of a flexible material, with a flexible fiber bundle of a lightweight high tensile strength material such as carbon, glass, Kevlar™, etc., tightly wound about the outer round cross section of the core at a controlled winding or helix angle. The core itself is then formed into a helical shape and set into this shape by use of a thermosetting material, as by curing a resin applied to the fiber bundle applied.

The winding or helix angle of the fiber windings has been found to control the spring rate. The fibers are more or less stressed maximally with the bending of the spring turns when the winding angle is at 45°, i.e., the spring rate is at a maximum at a 45° winding angle and is reduced as the winding angle is increased or decreased from 45°.

The spring is continuously produced by a process involving a cylindrical mold formed with an external helical groove of a major diameter equal to the desired spring diameter. The mold is heated to a temperature sufficient to cure the resin as the wound core traverses the length of the mold. The mold is continuously rotated to cause the wound core to be traversed from a receiving end to a delivery end as it is cured.

The wound core is subjected to a pulling force created by the frictional engagement of the portion of the wound core advanced to the delivery end of the rotated mold, creating a uniform section and optimal orientation of the fibers in similar fashion as the pultrusion process.

The wound core is thus formed into the helical spring shape by being wound onto the mold and the thermosetting material set by the heated mold. Desired spring lengths are cut off from the now helically formed wound core exiting the delivery ends

DESCRIPTION OF THE DRAWING FIGURES

FIG. 1 is a perspective view of a core being wound with a tensile fiber to produce a wound core for use in manufacturing a composite helical spring according to the present invention.

FIG. 2 is a side elevation view of a mold apparatus and wound core being formed therein into a helical spring.

DETAILED DESCRIPTION

According to the concept of the present invention, a hollow core 10 of a suitable flexible material, such as fiberglass rope, is wrapped with a tensile fiber bundle of high tensile strength at a particular winding angle A, ranging from 45° to either a greater or lesser angle. Such wrapping process is itself well known in the manufacture of insulated wire, referred to as the "serving" process.

The winding fiber 12 is preferably a lightweight high tensile strength material such as fibers of glass, carbon, Kevlar™, etc.

Referring to FIG. 2, a cylindrical mold 16 is mounted for rotation about its axis X, driven at slow speed by a motor 18 and speed reducer 20.

A helical groove 22 is machined into the perimeter, pitched to the desired pitch of the helical spring to be produced and of the same major diameter as that of the spring to be formed. The groove 22 is sized to receive the wound core 14 which nests therein, fed into a receiving end of the mold 16 (at the left in Fiber 2).

An internal heater 24 is mounted within the mold 16, capable of heating the mold 16 to a temperature which will cure a resin, with which the fibers 12 are impregnated-prior to being wound onto the core. Curing is substantially completed as the wound core 14 traverses the length of the mold 16, by heating to 300° F. for a typical resin.

Guide rollers 26 are arrayed about the mold 16, to rotatably support the mold 16 at the free delivery end thereof.

A traction control roller 28 is mounted for rotation in the circumferential direction and sized and configured to firmly frictionally engage the outer perimeter of a winding of the wound core 14 at the delivery end of the mold 16.

A toggle linkage 30 may be employed to create substantial pressure such as to create the frictional engagement between each segment of the wound core 14 and the mold groove 22 as each segment advances to the delivery end of the mold 16.

This establishes a gripping of the wound core 14 and causes a pulling force to be exerted tending to stretch the wound core 14 advancing into the groove 22 in the mold 16. A tension device 17 is provided to allow tension to develop along the length of the wound core 14. This creates a pultrusion-like effect when the resin is cured and bonding takes place. That is, the fibers are pulled into a loaded orientation with respect to the tensile stress. This is the same orientation as is optimal for the tensile loading as the helical spring is compressed.

The now formed coil spring 32 advances off the delivery end of the mold 16 continuously, and a cut-off mechanism 34 may cut off suitable spring lengths at desired intervals.

Thus, the process is suited for industrial application.

As mentioned, the wind angle A controls the spring rate for a given material and sizing, since the tensile loading of the fiber winding 12 by the spring compression corresponds to that angle. The tensile loading is at a maximum at 45°, and declines for increasing and decreasing winding angles from 45°. Thus, the spring rate can be easily varied and set to a desired value while using the same materials and overall spring size.

The resulting spring will perform with closely similar characteristics of metal springs, but of a much lighter weight.

This is important for example in the context of valve springs for automotive engines, as a significant vehicle weight reduction is achieved at low cost, and the engine itself will perform better.

What is claimed is:

1. A method of manufacturing a helical spring, comprising of the steps of:

tightly winding a tensile fiber bundle at predetermined wind angle onto a cylindrical flexible core, said fiber bundle coated with a thermosetting material;

advancing said core with said fiber bundle wound thereon into an entrance end of a helical exterior groove formed into a rotating cylindrical mold;

frictionally engaging each segment of said core with said fiber bundle wound thereon with said helical groove at a delivery end of said mold as each segment is advanced to said delivery end by rotation of said mold so as to create a pulling force on said wound core upstream from the delivery end of said mold while rotating said mold to continuously advance said wound core along said groove and out of said delivery end;

exerting a controlled tension on said wound core at said entrance end of said groove to develop a controlled tension along the length of said wound core to pull the fibers in said fiber bundle into a loaded orientation with respect to tensile stress; and, setting said thermosetting material while said wound core is advanced along said mold groove under tensile loading to continuously form helical spring windings exiting said delivery end of said mold.

2. The spring formed by the method of claim 1.

* * * * *